UNITED STATES PATENT OFFICE.

FRANZ A. RODY, OF NEWARK, NEW JERSEY, ASSIGNOR TO METALLURGICAL COMPANY OF AMERICA, OF NEW YORK, N. Y., A CORPORATION OF NEW JERSEY.

RECOVERING POTASH FROM LEUCITE.

1,325,881.      Specification of Letters Patent.      Patented Dec. 23, 1919.

No Drawing.      Application filed May 18, 1915.   Serial No. 28,894.

*To all whom it may concern:*

Be it known that I, FRANZ A. RODY, a subject of the Emperor of Germany, residing at and whose post-office address is No. 258 Van Buren street, Newark, county of Essex, State of New Jersey, have invented certain new and useful Improvements in Recovering Potash from Leucite; and I do hereby declare the following to be a full, clear, and exact description of the invention, such as will enable others skilled in the art to which it appertains to make and use the same.

This invention relates to a process of recovering potash from leucite, and deals more particularly with a method of causing an internal chemical change in the leucite which is found to facilitate the extraction of the alkalis. That the digestion of leucite in soluble sodium salts will effect the solution of potash, is known, and my invention is based on the discovery that a prior sintering materially aids the reaction.

Of the various soluble sodium salts, such as the hydroxid, carbonate, sulfate, chlorid, etc., the carbonate and hydroxid give the best results in this process.

In carrying out the process, crude leucite, such as is found in the State of Wyoming and which contains, in addition to free silica, considerable associated rock matter, is brought to a temperature of approximately 1100° C. and changes into a glass-like stringy mass. It is finely ground and digested under pressure with caustic soda, and the soda replaces the potash in the silicate.

The advantages of this method cannot better be shown than by referring to the results of certain comparative operations recently carried out.

|  | Leucite not sintered. | Leucite sintered. |
|---|---|---|
| Weight taken for experiment | 50 pounds | 50 pounds |
| Caustic soda in solution | 3.5 " | 3.5 " |
| Pressure per square inch | 80 " | 50 " |
| Length of digestion | 2 hours | 1 hour |
| Per cent. of dissolved potash | 50 | 88 |

From this comparison it is apparent that preliminary fusing increases the potash dissolved out of the leucite by about eighty per cent., and that the duration of the operation is diminished by fifty per cent., at a materially lower pressure.

In carrying out the operation, I usually add the equivalent amount of soda to the potash in the rock, but in some cases I have added an excess of soda amounting to as much as 10 to 12% of the weight of the rock.

The amount of the soda or of other sodium salt is such that the sodium replaces the potassium in the fused silicate. During the digestion, the solution becomes impoverished in sodium salts and enriched in potassium salts, while the fused silicate becomes impoverished in potash and enriched in soda. The present process is accordingly to be distinguished from such processes as involve decomposition of the entire mass of the leucite with resulting conversion of the silicate content thereof into a soluble alkali silicate.

What I claim is:

1. The method of recovering potash from leucite, which comprises first fusing the leucite and then replacing the potassium in the fused product by sodium by heating and digesting the fused product under pressure with a solution of sodium salts, the amount thereof being such that sodium will replace potassium in the fused leucite with resulting impoverishment of the leucite in potash and enrichment thereof in soda, and with corresponding impoverishment of the solution in soda and enrichment thereof in potash, substantially as described.

2. The method of recovering potash from leucite, which comprises first fusing the leucite, then grinding the fused product to a fine powder, and replacing the potassium in the fused product by sodium by digesting it under pressure with a solution of sodium hydroxid, the amount of the sodium hydroxid not exceeding about ten to twelve per cent. of the weight of the leucite, substantially as described.

3. The method of recovering potash from leucite, which comprises first fusing the leucite, and then digesting the fused product under pressure with sodium salts, in amount chemically equivalent to the potassium in the fused product, and not materially in excess of said chemical equivalent in presence of water, thereby obtaining the potash salts in solution; substantially as described.

4. The method of recovering potash from leucite, which comprises first fusing the leucite, and then digesting the fused product under pressure with a solution of a basic sodium compound, in amount chemically equivalent to the potassium in the fused product, and not materially in excess of said chemical equivalent, thereby obtaining the potash in solution, substantially as described.

In testimony whereof I affix my signature in presence of two witnesses.

FRANZ A. RODY.

Witnesses:
H. M. BURKEY,
JEROME S. KATZ.